Oct. 25, 1938.  S. O. WHITE  2,134,384
BLOCKER SYNCHRONIZER
Filed Sept. 25, 1936
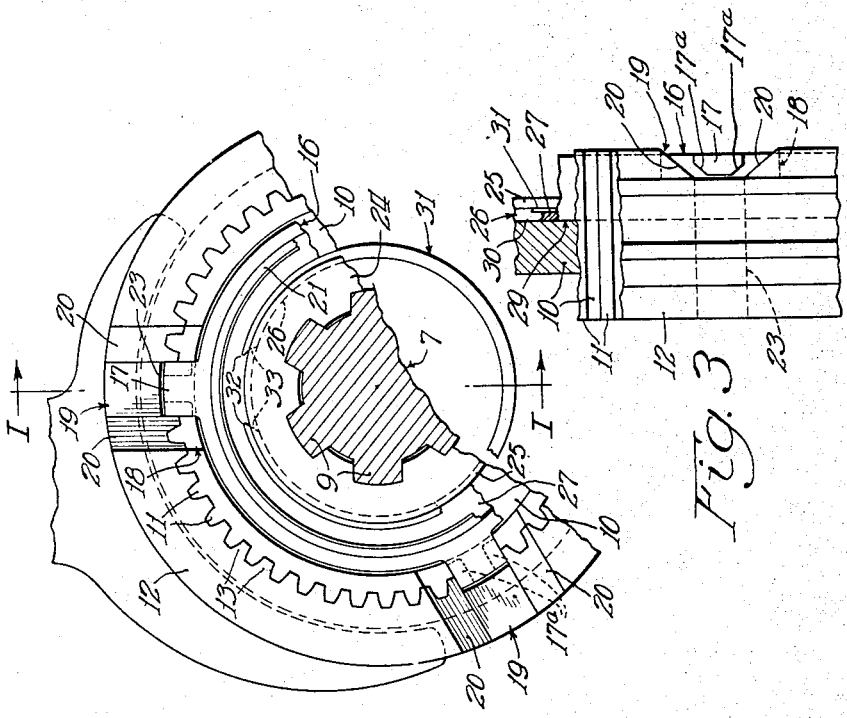
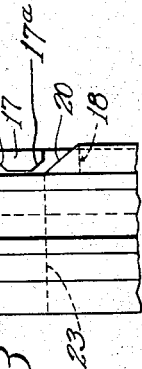
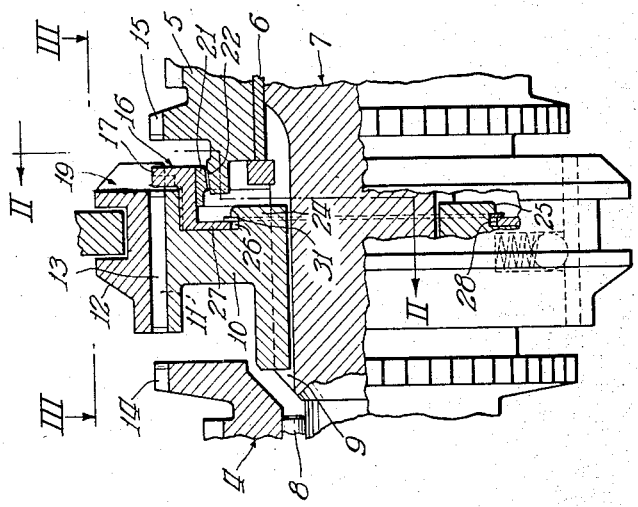
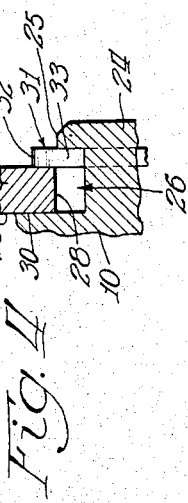
Inventor:
Samuel O. White
By: Edward C. Fitzhugh
Atty.

Patented Oct. 25, 1938

2,134,384

UNITED STATES PATENT OFFICE 2,134,384

BLOCKER SYNCHRONIZER

Samuel O. White, Muncie, Ind., assignor to Borg-Warner Corporation, Chicago, Ill., a corporation of Illinois Application September 25, 1936, Serial No. 102,516

1 Claim. (Cl. 192—53)

This invention relates to blocker synchronizers, and is concerned more particularly with an improved blocker mounting.

In the U. S. application of Palmer Orr, Serial No. 91,457 filed August 20, 1936, entitled "Transmission synchronizer", a blocker device is disclosed. In that disclosure, the blocker retracting means comprises, in one embodiment, a screw threaded into the clutch ring or hub and passing through a slot in the blocker. In another embodiment, blockers on opposite faces of the clutch hub or ring are connected to the latter by a clip engaged with the blockers as by friction.

It is a principal object of the present invention to improve the mounting of the blocker with a view to substantially permanently uniting the blocker with its supporting member.

It is a further object of the invention to provide for the expeditious and secure attachment of a synchronizing blocker to a support therefor.

Another object resides in the provision of a blocker mounting which will not get out of adjustment yet permit easy disassembly at will.

Further objects and advantages of the invention will appear as the description proceeds.

The invention will be best understood by reference to the following description of an embodiment thereof, shown in the accompanying drawing, wherein:

Fig. 1 is a longitudinal view, partly in section and partly in elevation, of a transmission mechanism embodying the invention, taken substantially as indicated by the line I—I in Fig. 2.

Fig. 2 is a fragmentary view, partly in section and partly in elevation, taken substantially as indicated by the line II—II in Fig. 1.

Fig. 3 is a fragmentary view taken as indicated by the line III—III in Fig. 1.

Fig. 4 is an enlarged fragmentary sectional view showing details of the invention.

Referring now particularly to the drawing, in which is illustrated a portion of a transmission such as may be found in automotive vehicles, in conjunction with marine engines, in stationary installations, and in fact in any assembly for the transmission of power, there is shown a drive shaft 4 and a driven gear 5 receiving torque from the drive shaft through gears including countershaft gearing (not shown) or other means, the gear 5 being journaled on a bushing 6 about a driven shaft 7 journaled at 8 in the drive shaft 4. Splined at 9 to the driven shaft 7 intermediate the drive shaft 4 and the gear 5 is a clutch hub 10 arranged to have slight longitudinal floating movement relative to the driven shaft 7. Slidably splined on the peripheral teeth 11 of the hub 10 is a clutch collar 12 whose teeth 13 are adapted to be clutched with clutch teeth 14 on the drive shaft to establish a driving connection between the drive shaft and the driven shaft through the hub 10, or with clutch teeth 15 carried by the gear 5 to establish a reduced speed driving connection through the hub 10 between the drive shaft and the driven shaft.

Suitably mounted in relation to the frame is a shift fork adapted to be yieldably held in the neutral position shown and in either of its two operating positions and received in an appropriate groove in the clutch collar for shifting the same.

Rotatably telescoped with the hub 10 is a blocker 16, the mounting of which constitutes the salient feature of the present invention. I have chosen, for purposes of illustration only, the synchronizer and blocker features disclosed in detail in said Orr application and will refer to them here briefly.

The blocker 16 may be provided with one or more blocking lugs 17, each adapted for limited rotary movement between the walls of a slot or notch 18 formed in the hub 10. The collar 12 is also slotted at 19, providing tapered walls 20 for engagement with similarly formed walls 17a on each lug 17. Securely attached to the blocker is a friction ring 21 for synchronizing engagement with the friction cone surface 22 associated with the gear 5. The collar 12 is provided with a groove 23 adapted to freely receive the lug 17.

When the drive between the gear 5 and shaft 7 is to be established, the collar 12 is moved to the right as seen in Fig. 1, carrying the hub 10 and blocker 16 therewith as a unit until the friction surfaces are engaged, whereupon, due to relative rotation between the shaft 7 and gear 5, the blocker is rotated relative to the hub to one limit of its movement, where its lug 17 obstructs the collar 12, by engaging one of the tapered surfaces 20. Continued pressure from the collar 12 increases the synchronizing pressure, bringing the blocker and gear 5 into substantial synchronism. Immediately following the establishment of synchronism, non-synchronism occurs, causing drift of the blocker relative to the hub 10 in a direction opposite to the original direction of its relative movement, bringing the lug 17 into register with the groove 23 in the collar 12 so that the latter may continue its movement to the right and clutch the teeth 15 on the gear 5.

From the foregoing, it will be readily understood how the blocker operates when the shift is being made to second. It will also be understood how a blocker mounted on the left side of the collar 10 would operate in the establishment of synchronized high speed.

In order to return the blocker axially with the hub 10 when the latter is returned to neutral position, to prevent accidental drag of the blocker against the cooperating friction surface, retracting means is provided. In accordance with the present invention, the hub 10 has an axial extension 24 which is outwardly flanged at 25 to provide an outwardly opening circumferential groove 26. The blocker has an inwardly extending flange 27 whose inner periphery 28 is such as to telescopically clear the extension flange so that the blocker flange may be located with a wall 29 thereof adapted to engage the hub wall 30 forming a continuation of a wall of the groove.

The thickness of the blocker flange 27 is substantially less than the width of the groove, and this difference affords a space for the reception of a split snap retainer or ring 31. This retainer is adapted to be resiliently expanded so as to telescopically snap by the extension flange 25 and into the groove into which it contracts. When contracted in the groove, the retainer projects outwardly to such an extent as to overlap the blocker flange 27, the inner periphery of the retainer being in substantial engagement with the bottom of the groove, so as to effectively retain the blocker in place against accidental displacement. Sufficient tolerance or clearance is provided between the parts to avoid drag and allow free relative rotary movement between the blocker and the hub. In positioning the blocker preparatory to application of the retainer, it is necessary merely to position the lug or lugs of the blocker in the slot or slots in the hub 10, the slot holding each lug, and therefore the blocker, in proper cooperative relation to the hub while the snap ring is being applied.

To facilitate this assembly, it will be observed that the snap ring ends 32 are tapered at 33 away from the bottom periphery of the groove 26 to provide easily gripped or accessible portions which materially facilitate manual spreading or prying of said ends to spring the ring sufficiently to remove the same from the groove axially past the hub flange 25.

This invention accordingly provides an extremely simple, inexpensive, expedient, efficient and durable mounting which will not get out of order, and which may be readily disassembled for repair or replacement, should the occasion require.

I am aware that many changes may be made and numerous details of construction may be varied through a wide range without departing from the principles of this invention, and I therefore do not purpose limiting the patent granted hereon otherwise than necessitated by the prior art.

I claim as my invention:

In a transmission synchronizer of the character described, a first power transmission member mounted for rotation about a fixed axis, a second power transmission member coaxial with said first member, each of said power members having radially extending toothed portions, the toothed portion of one member adapted for end to end alignment with the toothed portion of the other member, an axially movable positive clutch member adapted to bridge and to engage the toothed portions of said power members, thereby to provide a direct two-way driving connection between the members, said first power member having a recess in that end wall facing said second power member, a blocker and synchronizer ring having a part disposed between the toothed portions of said power members and adapted at times to engage with and retard axial movement of said positive clutch member, said blocker and synchronizer ring having a relatively narrow flange portion extending within said recess and laterally offset relative to said ring part in the direction of said first power member, and a locking ring engageable with said first power member and adapted to abut said last named flange portion of said blocker and synchronizer ring, thereby to restrain said blocker and synchronizer ring from axial movement relative to said first power member, said locking ring and said flanged portion being disposed entirely within said recess, thereby to minimize the distance between said power members, said blocker and synchronizer ring and said second power member having cooperating friction surfaces adapted when engaged to bring said members to a common speed.

SAMUEL O. WHITE.